INVENTOR
Sutekiyo Uozumi

Feb. 15, 1966  SUTEKIYO UOZUMI  3,235,795
NON-DESTRUCTIVE TESTING OF MATERIALS BY PULSED
ELECTROMAGNETIC WAVES
Filed Aug. 30, 1961  2 Sheets-Sheet 2

INVENTOR
Sutekiyo Uozumi

United States Patent Office 3,235,795
Patented Feb. 15, 1966

3,235,795
NON-DESTRUCTIVE TESTING OF MATERIALS BY PULSED ELECTROMAGNETIC WAVES
Sutekiyo Uozumi, 1928 Hazama-cho, Hachioji, Tokyo, Japan
Filed Aug. 30, 1961, Ser. No. 134,957
Claims priority, application Japan, Oct. 12, 1960, 35/41,048
8 Claims. (Cl. 324—40)

The present invention relates to the testing of materials by using pulsed electromagnetic waves.

More particularly, the invention relates to the non-destructive testing of materials by pulsed electromagnetic waves characterized by placing a search coil, excited with pulsed electromagnetic waves, near materials to be tested; the change of electromagnetic reaction occurring in the search coil being detected whereby the sorts, qualities, thickness, etc. of the materials are determinable.

An object of the invention is to provide means for testing material non-destructively by transient oscillation of a search coil with high sensitivity and efficiency.

Another object of the invention is to simplify and minimize the testing apparatus and to reduce the electric power used.

A further object of the invention is to facilitate changing the range of low frequencies and transient high frequencies used.

The objects, features and advantages of the invention will be apparent from the detailed description of an illustrative form of the same which will now be set forth in conjunction with the accompanying drawings, in which FIG. 1 is a schematic wiring diagram of the apparatus used in the testing;

There have been known apparatus for testing materials using excitation by continuous wave for the purpose of detecting the reactions corresponding to hysteresis characteristics. However, with such a method there are defects. The detection is not sensitive due to outside electromagnetic disturbances. A large amount of current is necessary. The apparatus is unduly large and electric power requirements are high.

Figure 1:
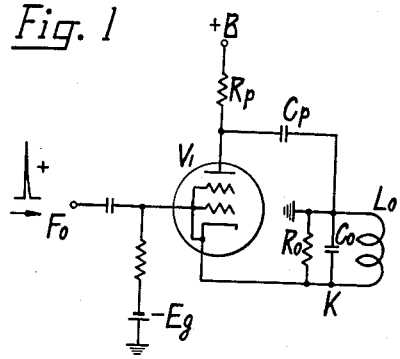
Figure 5:
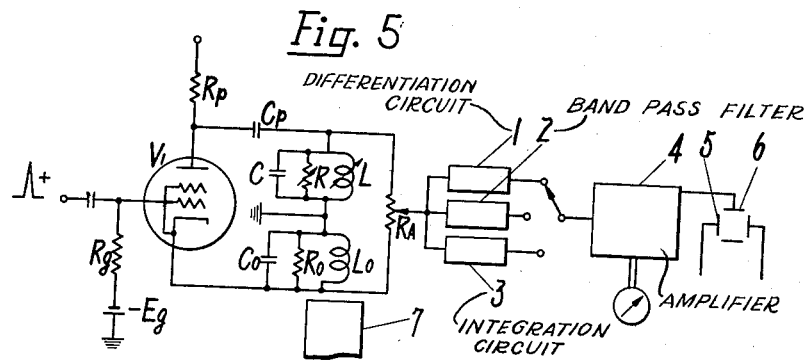
FIG. 5 is a combined schematic wiring diagram and block diagram of a testing circuit embodying the invention.

These defects are obviated by the present invention. Referring to the figures, the invention will be explained as follows:

In FIGS. 1 and 5, $V_1$ designates a grid-controlled discharge tube. $L_0$ is an inductance. $C_0$ is a condenser and $R_0$ is a resistance. These components $L_0$, $C_0$ and $R_0$ are connected in parallel to form a search inductance.

The search inductance is connected between the anode and cathode of the discharge tube $V_1$ through a condenser $Cp$. $Eg$ designates a negative bias voltage and $+B$ designates a positive supply voltage.

Figure 2:
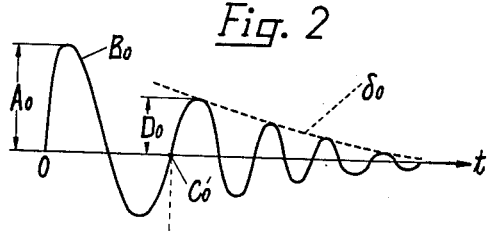
FIG. 2 shows a wave form presented in its ordinary state on a Braun tube.

When pulses having a pulse repetition rate, or repeating frequency, $F_0$ are applied to the input side of the discharge tube $V_1$, the voltage wave form at the point K appears as shown in FIG. 2. The fundamental portion of each pulse has an amplitude $A_0$ and the wave form $B_0$. The transient high frequency produces a wave form with the amplitude $D_0$ having wave length so as to cross the abscissa at the point $C'_0$; and, as shown, the damping curve, or envelope, $\delta_0$ appears. These can be shown on a Braun tube.

Figure 3:
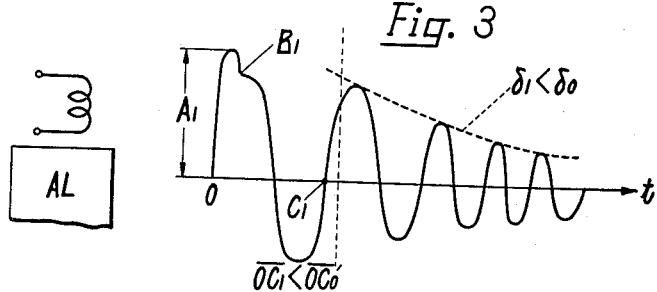
FIG. 3 and FIG. 4 show the wave forms presented during the testing of materials.
Figure 4:
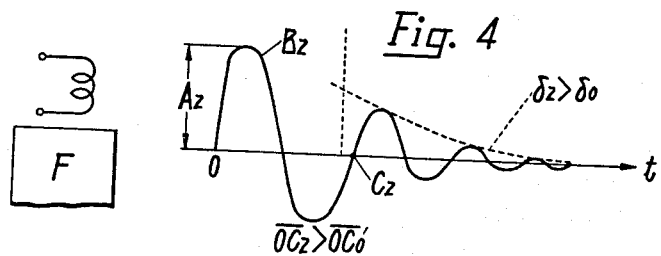

For example, when the search coil approaches an aluminum material, such as indicated at AL in FIG. 4, the voltage wave form corresponding to the fundamental frequency of the pulse repetition and that corresponding to the transient oscillation of the high frequency determined by the characteristics of the search unit can be obtained at the point K. Accordingly as shown at FIG. 3, the amplitude $A_0$ changes to $A_1$. The wave form at the portion $B_0$ becomes indented as at $B_1$. The wave length changes such that $\overline{OC_1} < \overline{OC'_0}$. The point $C'_0$ shifts to $C_1$. The damping curve changes such that $\delta_1 < \delta_0$.

When the search unit approaches an iron material F as shown in FIG. 4, the amplitude $A_0$ changes to $A_2$. The crest $B_0$ expands to the form $B_2$. The phase-crossing point $C'_0$ becomes $C_2$. The wave length changes such that $\overline{OC_2} > \overline{OC'_0}$ and the damping curve changes such that $\delta_2 > \delta_0$.

In this way, corresponding to different materials, the characteristic reaction of each material based on individual losses of resistance, eddy current, hysteresis, residual stress, etc. in the field of pulsed electromagnetic waves can be observed as the change of input waves of the search unit.

Accordingly, the subject apparatus can be used for testing various materials regardless of whether the materials are magnetic or nonmagnetic. Further, since the wave form in a range of fundamental frequencies and the wave form in a range of transient high frequencies in the apparatus can be observed at the same time, the materials to be tested can be inspected by previously determining the wave form of each material.

In the invention, as the pulsed exciting current is applied to the discharge tube $V_1$, the tube is instantly triggered to the conductive state by each pulse and the search unit is excited by a large amplitude tube output pulse. At the end of each input pulse, the discharge tube is cut off so that the output circuit which connects the input of the search unit across the discharge tube is interrupted at the discharge tube. As the condenser $C_0$ in the search unit is charged by the tube output pulse, the search unit oscillates due to transient phenomena due to the discharge current of the condenser $C_0$. In this period, as the discharge tube is cut off, the oscillating circuit includes only the search unit. Therefore, the reaction energy of the search unit, in which the tested material is located, is perfectly utilized to produce the wave form. Such actions are repeated by the repeating pulsed waves and the detection of the reaction with high sensitivity and efficiency is attainable. The average electric power required becomes remarkably small. For example, when a peak exciting current of 100 ma., pulse repeating frequencies of 50 c./s. and pulse-width of 40 μs. are applied, the average current required is only 0.2 ma.

Further, for the purpose of changing the fundamental frequency, the pulse repeating frequency $F_0$ may be changed. Also, for the purpose of changing the transient high frequency, $L_0$ and $C_0$ in the circuit of the search unit may be changed. Thus, the range of frequencies to be applied can be changed easily.

For the purpose of presenting a characteristic wave form on a Braun tube, various known methods of detection can be applied. As an example of such known methods the detecting method by means of differential amplification through a bridge circuit is shown in FIG. 5. The search coil comprising coil $L_0$, resistance $R_0$ and condenser $C_0$, similar to those in FIG. 1 is connected in series to another parallel circuit, forming a second search coil, and comprising a variable coil or inductance L, a variable resistance R, and a condenser C. These two search coils are connected together with an adjustable resistance $R_A$, having a movable tap, to form a bridge circuit. A grid-controlled discharge tube $V_1$ is connected between two opposite junction points of this bridge, a third junction point being grounded and the fourth junction point being constituted by the adjustable tap of resistance $R_A$.

The bridge network can be adjusted for zero output, with no material to be tested either adjacent or passing through the search units, by means of the variable inductance L, the variable resistance R, and the adjustable tap of resistance $R_A$. In order to detect flaws in material 7 passing through the search units at a relatively rapid rate, a differentiation circuit 1 is connected to the adjustable tap of resistance $R_A$. A differentiation circuit is particularly suitable for this type of flaw detection because its output changes impulse-wise.

In order to compare and determine hysteresis characteristics (H-B characteristics) of the material 7 to be tested, a band-pass filter 2 is connected to the adjustable tap of resistance $R_A$. A band-pass filter is appropriate for determining hysteresis characteristics because of its frequency response. An integration circuit 3 is connected to the adjustable tap $R_A$ for the purpose of continuously measuring deviations in size, as such an integration circuit has a gradual response characteristic.

By applying the outputs of circuits 1, 2 and 3, through an amplifier 4, to the vertical plates 6 of a Braun-tube, whose horizontal plates 5 are synchronized with the input pulse, and by balancing the bridge network, a standard wave form is presented on the Braun tube. In similar operation, by placing a search coil near to the testing material 7, there figured a proper wave form corresponding to the material in the Braun tube.

For the purpose of detecting flaws, two search units are arranged adjacent each other and situated coaxially together. The material 7 to be tested is passed through these search coils at a constant high speed. The pulse output from the portion of the material having no flaws is balanced by adjusting the variable search unit, LRC. However, when a part of the material having a flaw therein is passing through the search units, the output of the bridge network is presented only indistinctly on the Braun-tube. In this case the flaw's position can be determined precisely and quickly because of the relative high speed between the search units and the material to be tested. By this method the differentiation network is effective to detect only the dominant flaw which suppresses the other undesirable fluctuations; for instance, those caused by dimensional fluctuation.

For the purpose of sorting metals, such as those of magnetic material, the bridge network's output, when in a balanced condition, contains certain odd harmonics, especially the third or fifth harmonics. The outputs may be selectively amplified by the band-pass filter 2. Thus, by detecting the odd harmonics, the structure, tempering state or magnetic characteristics of the material being tested can be determined.

In order to test the material dimensionally, the arrangement of the bridge and the search unit is similar to that used in the aforementioned flaw testing method. The dimensional fluctuations of the material being tested occur more slowly and gradually than the detection of flaws since the material is travelling at a relatively high speed with reference to the search units. Accordingly, the output is integrated by the integration circuit 3 and this output is observed on the Braun tube. The change of the dimensions of the material being tested can be detected. With such an arrangement the dimensional variations will be dominant, thereby suppressing the other undesirable fluctuations such as those caused by flaws, for instance.

Having thus described my invention, I claim:

1. Apparatus for non-destructive testing of materials comprising, a momentary discharge device; a search unit connected across said discharge device and including a resistance, a condenser and an inductance connected in parallel with each other; means for applying time-spaced periodic pulses to said discharge device to momentarily discharge the same in response to each pulse applied thereto whereby an output pulse corresponding to the instantaneous discharge current of said condenser produces a transient phenomena in said search unit; means for detecting the amplitude-time wave form of said transient phenomena, the wave form of said transient phenomena being variable in accordance with the characteristics of material within the field of said search unit, whereby the characteristics of a particular material within the field of said search unit may be determined by detection of the wave form of said transient phenomena.

2. Apparatus for non-destructive testing of materials, as claimed in claim 1, in which said discharge device becomes non-conductive immediately upon the disappearance of an applied input triggering pulse whereby said search unit is cut off from said discharge device during the period when the transient phenomena occurs so that said search unit will oscillate at a natural frequency depending upon its ambient field condition.

3. Apparatus for the non-destructive testing of materials, as claimed in claim 1, in which said discharge device is a grid-controlled discharge tube; said search unit being connected between the anode and cathode of said tube; said spaced periodic input pulse being applied to the grid of said discharge tube.

4. Apparatus for the non-destructive testing of materials, as claimed in claim 3, including a second condenser connected in series between said search unit and said discharge tube.

5. Apparatus for the non-destructive testing of materials, as claimed in claim 3, including a second unit connected in series with said search unit in the output circuit of said discharge tube; said second unit including a variable resistance, a second condenser, and a variable inductance connected in parallel with each other; means connecting said search unit, said second unit, said discharge tube, and a resistor, having an adjustable tap, in a bridge circuit; the anode and cathode of said discharge tube being connected to opposite junction points of said bridge; said detecting means comprising a Braun tube having its horizontal plates synchronized with the input pulse; and means, including a differentiation circuit, connecting the vertical plates of said Brau tube to said bridge.

6. Apparatus for the non-destructive testing of materials, as claimed in claim 5, including a band-pass filter; means selectively operable to connect either said differentiation circuit or said band-pass filter between said bridge and said Braun tube.

7. Apparatus for the non-destructive testing of materials, as claimed in claim 5, including an integration circuit; means selectively operable to connect either said differentiation circuit or said integration circuit between said bridge and said Braun tube.

8. Apparatus for the non-destructive testing of materials, as claimed in claim 5, including a band-pass filter; an integration circuit; and means selectively operable to connect any one of said differentiation circuit, said band-pass filter, and said integration circuit between said bridge and said Braun tube.

References Cited by the Examiner

UNITED STATES PATENTS

| | | | |
|---|---|---|---|
| 2,177,528 | 10/1939 | Kidd | 324—54 X |
| 2,435,680 | 2/1948 | Goldsmith et al. | 324—40 |

RICHARD B. WILKINSON, *Primary Examiner.*

FREDERICK M. STRADER, *Examiner.*

ROBERT B. LAPIN, *Assistant Examiner.*